(12) United States Patent
Gilon et al.

(10) Patent No.: US 8,360,051 B2
(45) Date of Patent: Jan. 29, 2013

(54) SOLAR RECEIVER WITH ENERGY FLUX MEASUREMENT AND CONTROL

(75) Inventors: Yoel Gilon, Jerusalem (IL); Gil Kroyzer, Jerusalem (IL); Rotem Hayut, Jerusalem (IL)

(73) Assignee: Brightsource Industries (Israel) Ltd., Jerusalem (IL)

( * ) Notice: Subject to any disclaimer, the term of this patent is extended or adjusted under 35 U.S.C. 154(b) by 1077 days.

(21) Appl. No.: 12/269,793

(22) Filed: Nov. 12, 2008

(65) Prior Publication Data

US 2009/0250052 A1    Oct. 8, 2009

Related U.S. Application Data

(60) Provisional application No. 60/987,133, filed on Nov. 12, 2007.

(51) Int. Cl.
*F24J 2/38* (2006.01)

(52) U.S. Cl. ........ 126/578; 126/573; 126/572; 126/600; 126/680; 126/684; 126/688; 374/137; 250/203.4; 60/641.8; 60/641.11; 60/641.15; 359/853

(58) Field of Classification Search .................. 126/578, 126/573, 600, 680, 684, 688; 374/137; 250/203.4; 359/853; 60/641.8, 641.11, 641.15
See application file for complete search history.

(56) References Cited

U.S. PATENT DOCUMENTS

| | | | |
|---|---|---|---|
| 811,274 A | 1/1906 | Carter | |
| 2,999,943 A | 9/1961 | Willard | |
| 3,504,524 A * | 4/1970 | Maley | ................................ 374/5 |
| 3,563,771 A * | 2/1971 | Tung | ................................ 501/33 |
| 3,670,717 A * | 6/1972 | Abbot | ................................ 126/687 |
| 3,892,433 A | 7/1975 | Blake | |
| 3,924,604 A | 12/1975 | Anderson | |
| 4,034,735 A | 7/1977 | Waldrip | |
| 4,044,753 A | 8/1977 | Fletcher et al. | |
| 4,102,326 A | 7/1978 | Sommer | |
| 4,117,682 A | 10/1978 | Smith | |
| 4,146,785 A | 3/1979 | Neale | |
| 4,172,443 A | 10/1979 | Sommer | |
| 4,219,729 A * | 8/1980 | Smith | ........................ 250/203.4 |

(Continued)

FOREIGN PATENT DOCUMENTS

| | | | |
|---|---|---|---|
| DE | 3325919 A1 * | 1/1985 | |
| DE | 10248068 | 5/2004 | |

(Continued)

OTHER PUBLICATIONS

BCB Informatica y Control. Heliostat Calibration for Concentrating Solar Power Plants Using Machine Vision [online]. [retrieved on Nov. 17, 2009]. Retrieved from the Internet: <URL: http://bcb.es/documentos/descargar.php?id=29>.

(Continued)

*Primary Examiner* — Carl Price
(74) *Attorney, Agent, or Firm* — Miles & Stockbridge PC; Mark A. Catan

(57) ABSTRACT

A solar energy collection system has a solar receiver with an external surface configured for high absorption of light incident thereon. The solar receiver also has a plurality of light-reflecting elements arranged on the external surface. The light-reflecting elements produce at least partially diffuse reflection of light energy incident thereon. Heliostats concentrate solar radiation onto the external surface of the solar receiver. An imaging device provides a digital image of at least a portion of the external surface of the solar receiver. A controller can control the heliostats in response to apparent brightness of the light-reflecting elements as represented in the digital image.

20 Claims, 3 Drawing Sheets

U.S. PATENT DOCUMENTS

| | | | |
|---|---|---|---|
| 4,227,513 A | 10/1980 | Blake et al. | |
| 4,245,618 A | 1/1981 | Wiener | |
| 4,247,182 A | 1/1981 | Smith | |
| 4,265,223 A | 5/1981 | Miserlis et al. | |
| 4,283,887 A | 8/1981 | Horton et al. | |
| 4,289,114 A | 9/1981 | Zadiraka | |
| 4,297,521 A | 10/1981 | Johnson | |
| 4,331,829 A | 5/1982 | Palazzetti et al. | |
| 4,343,182 A * | 8/1982 | Pompei | 374/31 |
| 4,365,618 A | 12/1982 | Jones | |
| 4,438,630 A | 3/1984 | Rowe | |
| 4,440,150 A * | 4/1984 | Kaehler | 126/602 |
| 4,459,972 A | 7/1984 | Moore | |
| 4,474,169 A | 10/1984 | Steutermann | |
| 4,485,803 A | 12/1984 | Wiener | |
| 4,490,981 A | 1/1985 | Meckler | |
| 4,502,200 A * | 3/1985 | Anderson et al. | 29/525.04 |
| 4,512,336 A | 4/1985 | Wiener | |
| 4,564,275 A * | 1/1986 | Stone | 353/3 |
| 4,633,854 A | 1/1987 | Mayrhofer | |
| 4,832,451 A * | 5/1989 | Trescott | 359/641 |
| 4,883,971 A * | 11/1989 | Jensen | 250/495.1 |
| 4,913,129 A | 4/1990 | Kelly et al. | |
| 5,128,799 A | 7/1992 | Byker | |
| 5,139,412 A * | 8/1992 | Kychakoff et al. | 431/12 |
| 5,185,526 A * | 2/1993 | Reitman et al. | 250/332 |
| 5,417,052 A | 5/1995 | Bharathan et al. | |
| 5,578,140 A | 11/1996 | Yogev et al. | |
| 5,759,251 A | 6/1998 | Nakamura et al. | |
| 5,771,099 A * | 6/1998 | Ehbets | 356/620 |
| 5,861,947 A * | 1/1999 | Neumann | 356/216 |
| 5,862,799 A | 1/1999 | Yogev et al. | |
| 5,899,199 A | 5/1999 | Mills | |
| 5,905,590 A | 5/1999 | Van Der Sluis et al. | |
| 5,969,369 A * | 10/1999 | Fogarty | 250/495.1 |
| 5,982,481 A | 11/1999 | Stone et al. | |
| 6,080,927 A | 6/2000 | Johnson | |
| 6,131,565 A | 10/2000 | Mills | |
| 6,231,197 B1 * | 5/2001 | Nakamura | 359/853 |
| 6,310,725 B1 | 10/2001 | Duine et al. | |
| 6,465,787 B1 * | 10/2002 | Coulter et al. | 250/341.3 |
| 6,493,620 B2 * | 12/2002 | Zhang | 701/45 |
| 6,530,369 B1 * | 3/2003 | Yogev et al. | 126/680 |
| 6,597,709 B1 | 7/2003 | Diver, Jr. | |
| 6,604,436 B1 * | 8/2003 | Lewandowski et al. | 73/865.6 |
| 6,653,551 B2 | 11/2003 | Chen | |
| 6,662,801 B2 | 12/2003 | Hayden et al. | |
| 6,806,480 B2 * | 10/2004 | Reshef | 250/495.1 |
| 6,818,818 B2 | 11/2004 | Bareis | |
| 6,899,097 B1 | 5/2005 | Mecham | |
| 6,926,440 B2 | 8/2005 | Litwin | |
| 6,957,536 B2 | 10/2005 | Litwin et al. | |
| 6,959,993 B2 | 11/2005 | Gross et al. | |
| 7,042,615 B2 | 5/2006 | Richardson | |
| 7,191,597 B2 | 3/2007 | Goldman | |
| 7,191,736 B2 | 3/2007 | Goldman | |
| 7,193,209 B2 * | 3/2007 | Djordjevic | 250/330 |
| 7,207,327 B2 | 4/2007 | Litwin et al. | |
| 7,296,410 B2 | 11/2007 | Litwin | |
| 7,331,178 B2 | 2/2008 | Goldman | |
| 7,340,899 B1 | 3/2008 | Rubak et al. | |
| 7,523,921 B2 | 4/2009 | Garrity | |
| 7,690,377 B2 * | 4/2010 | Goldman et al. | 126/655 |
| 7,884,279 B2 | 2/2011 | Dold et al. | |
| 8,001,960 B2 * | 8/2011 | Gilon et al. | 126/600 |
| 8,033,110 B2 * | 10/2011 | Gilon et al. | 60/641.11 |
| 8,063,349 B2 * | 11/2011 | Huss et al. | 250/203.4 |
| 2004/0086021 A1 * | 5/2004 | Litwin | 374/120 |
| 2004/0231716 A1 | 11/2004 | Litwin | |
| 2005/0126170 A1 | 6/2005 | Litwin | |
| 2006/0201498 A1 * | 9/2006 | Olsson et al. | 126/605 |
| 2007/0084208 A1 | 4/2007 | Goldman | |
| 2007/0157614 A1 | 7/2007 | Goldman | |
| 2007/0157922 A1 | 7/2007 | Radhakrishnan et al. | |
| 2007/0221208 A1 | 9/2007 | Goldman | |
| 2007/0272234 A1 | 11/2007 | Allen et al. | |
| 2008/0000436 A1 | 1/2008 | Goldman | |
| 2008/0011288 A1 | 1/2008 | Olsson | |
| 2008/0011290 A1 | 1/2008 | Goldman et al. | |
| 2008/0293132 A1 | 11/2008 | Goldman et al. | |
| 2008/0295883 A1 | 12/2008 | Ducellier et al. | |
| 2008/0314438 A1 | 12/2008 | Tran et al. | |
| 2009/0038608 A1 | 2/2009 | Caldwell | |
| 2009/0056701 A1 | 3/2009 | Mills et al. | |
| 2009/0107485 A1 | 4/2009 | Reznik et al. | |
| 2009/0151769 A1 | 6/2009 | Corbin et al. | |
| 2009/0178668 A1 | 7/2009 | Boggavarapu | |
| 2009/0217921 A1 * | 9/2009 | Gilon et al. | 126/600 |
| 2009/0229264 A1 | 9/2009 | Gilon et al. | |
| 2010/0006087 A1 * | 1/2010 | Gilon et al. | 126/572 |
| 2010/0139644 A1 * | 6/2010 | Schwarzbach et al. | 126/573 |
| 2010/0175738 A1 * | 7/2010 | Huss et al. | 136/246 |
| 2010/0191378 A1 | 7/2010 | Gilon et al. | |
| 2010/0236239 A1 | 9/2010 | Kroizer et al. | |
| 2010/0263709 A1 | 10/2010 | Norman et al. | |
| 2010/0282242 A1 * | 11/2010 | Gilon et al. | 126/600 |
| 2010/0300510 A1 | 12/2010 | Goldman et al. | |
| 2011/0036343 A1 | 2/2011 | Kroyzer et al. | |
| 2011/0088396 A1 | 4/2011 | Katz et al. | |
| 2011/0220091 A1 | 9/2011 | Kroyzer | |
| 2012/0024282 A1 | 2/2012 | Gilon et al. | |

FOREIGN PATENT DOCUMENTS

| | | | |
|---|---|---|---|
| DE | 10248068 A1 * | 5/2004 | |
| EP | 0106688 | 3/1985 | |
| JP | 56-102646 | 8/1981 | |
| JP | 61095221 A * | 5/1986 | |
| JP | 02182600 A * | 7/1990 | |
| WO | WO 2004/004016 | 1/2004 | |
| WO | WO 2004/067933 | 8/2004 | |
| WO | WO 2007/118223 | 10/2007 | |
| WO | WO 2008/092194 | 8/2008 | |
| WO | WO 2008/092195 | 8/2008 | |
| WO | WO 2008/114248 | 9/2008 | |
| WO | WO 2008/118980 | 10/2008 | |
| WO | WO 2008/128237 | 10/2008 | |
| WO | WO 2008/154599 | 12/2008 | |
| WO | WO 2009/015219 | 1/2009 | |
| WO | WO 2009/015388 | 1/2009 | |
| WO | WO 2009/021099 | 2/2009 | |
| WO | WO 2009/055624 | 4/2009 | |
| WO | WO 2009/070774 | 6/2009 | |
| WO | WO 2009/103077 | 8/2009 | |
| WO | WO 2009/131787 | 10/2009 | |
| WO | WO 2011/064718 | 6/2011 | |
| WO | WO 2011/140021 | 11/2011 | |
| WO | WO 2012/014153 | 2/2012 | |

OTHER PUBLICATIONS

"Central Receiver Systems" in: Stine, W.B., and Geyer, M., Power from the Sun [online], 2001 [retrieved on Nov. 17, 2009]. Retrieved from the Internet: <URL: http://www.powerfromthesun.net/Chapter10/Chapter10new.htm>, Chapter 10.

Rabl, A., "Tower Reflector for Solar Power Plan," *Solar Energy*, 1976, 18: pp. 269-271.

Stone, K.W., and Jones, S.A., "Analysis of Solar Two Heliostat Tracking Error Sources," Sandia National Laboratories, Report No. SAND99-0239C, Jan. 28, 1999.

Vant-Hull, L.L., and Pitman, C.L., "Static and Dynamic Response of a Heliostat Field to Flux Density Limitations on a Central Receiver," *Solar Engineering*, 1990, pp. 31-38.

Cohen et al., "Final Report on the Operation and Maintenance Improvement Project for Concentrating Solar Power Plants," SAND99-1290 [online], Jun. 1999 [retrieved on May 16, 2012]. Retrieved from the Internet: <URL: http://infohouse.p2ric.org/ref/17/16933/1693301.pdf>.

Lopez-Martinez et al., "Vision-based system for the safe operation of a solar power tower plant," *Iberamia*, 2002, LNAI 2527: pp. 943-952.

"Mean and Peak Wind Load Reduction on Heliostats," Colorado State University, Solar Energy Research Institute, U.S. Department of Energy [online], Sep. 1987 [retrieved on May 16, 2012]. Retrieved from the Internet: <URL: http://www.nrel.gov/docs/legosti/old/3212.pdf>.

Meduri et al., "Performance Characterization and Operation of Esolar's Sierra Suntower Power Tower Plant," SolarPACES 2010 Conference, Sep. 21-24, 2010, Perpignan, France.

Mills et al., "Multi-Tower Solar Array Project," *Proceedings of the Solar Harvest Conference, 40th Annual ANZSES Conference*, 2002.

Peterka et al., "Wind Load Reduction for Heliostats," Solar Energy Research Institute, U.S. Department of Energy [online], May 1986 [retrieved on May 16, 2012]. Retrieved from the Internet: <URL: http://www.nrel.gov/docs/legosti/old/2859.pdf>.

Phipps, Gary S., "Heliostat Beam Characterization System Calibration Technique," U.S. Department of Commerce, National Technical Information Service, Sandia Labs, SAND791532C, 1979.

Pottler et al., "Photogrammetry: A Powerful Tool for Geometric Analysis of Solar Concentrators and Their Components," Journal of Solar Energy Engineering, Feb. 2005, 127(1): pp. 94-101.

Roschke, E.J., "Wind Loading on Solar Concentrators: Some General Considerations," Jet Propulsion Laboratory, National Aeronautics and Space Administration, U.S. Department of Energy [online], May 1984 [retrieved May 16, 2012]. Retrieved from the Internet: <URL: http://ntrs.nasa.gov/archive/nasa/casi.ntrs.nasa.gov/19840024844_1984024844.pdf>.

Shortis et al., "Photogrammetric Analysis of Solar Concentrators," Proceedings of the 12th Australian Remote Sensing and Photogrammetry Conference, Fremantle, Australia, 2004, pp. 1-10.

Slack et al., "Esolar Power Tower Performance Modeling and Experimental Validation," SolarPACES 2010 Conference, Sep. 21-24, 2010, Perpignan, France.

Strachan, J.W. and Houser, R.M., "Testing and Evaluation of Large-Area Heliostats for Solar Thermal Applications," Solar Thermal Test Department, Sandia National Laboratories, SAND92-1381, Feb. 1993.

\* cited by examiner

SOLAR RECEIVER WITH ENERGY FLUX MEASUREMENT AND CONTROL

CROSS-REFERENCE TO RELATED APPLICATIONS

This application claims the benefit of U.S. Provisional Patent Application No. 60/987,133, filed on Nov. 12, 2007.

FIELD

This application relates generally to the conversion of solar radiation to electric power, and, more particularly, to directly monitoring the energy flux impinging on a surface of a solar receiver in a solar energy-based power generation system.

SUMMARY

Systems, method, and devices for directly monitoring the energy flux impinging on a surface of a solar receiver in a solar energy-based power generation system are disclosed herein.

In an example, a solar energy collection system includes at least one receiver configured to receive on an external surface thereof reflected solar radiation from heliostats. The at least one receiver houses at least one fluid conveying member for conveying a working fluid therethrough. The external surface can have a light-absorbing coating thereon. The solar energy collection system can also include light-reflecting elements disposed on the external surface. The light-reflecting elements can produce at least partially diffuse reflection of light energy reflected thereon by the heliostats. The solar energy collection system can include an imaging device for determining the apparent brightness of each of the light-reflecting elements and providing a brightness signal. A controller can be configured to compute a flux distribution across the surface of the at least one receiver responsively to the apparent brightness signal. Preferably, the light-reflecting elements produce substantially diffuse reflection of light energy reflected thereon by the heliostats.

The brightness signal can define an image. The imaging device can include a camera.

Each of the light-reflecting elements can have a uniform, constant and predetermined reflectivity over its surface. The light-reflecting elements can be arranged at different locations on the external surface of the at least one receiver. The surface area of the external surface covered by said plurality of light-reflecting elements can be less than 1% of the total surface area of the external surface. The light-absorbing coating has an absorptivity in the visible light band that is greater than 95% and an emissivity in the infrared band of less than 90%. A ratio of visible light flux reflected by the light-reflecting elements to that reflected by the light-absorbing coating can be at least 10 to 1.

The light-reflecting elements can be painted with a uniform reflective coating. The reflective coating can be high-temperature paint with additives for enhanced refraction. The additives can include beads. The beads can have a diameter less than 50 μm.

The light-reflecting elements can include a diffusively reflective solid. The diffusively reflective solid can be mixed in with the light-absorbing coating.

The light-reflecting elements can include a thread or a tape. The light-reflecting elements can include a plurality of threads arranged so as to form a shroud.

In an example, a solar energy collection system can include a solar receiver having an external surface configured for high absorption of light. The solar receiver can also have a plurality of light-reflecting elements arranged on the external surface. The light-reflecting elements can produce at least partially diffuse reflection of light energy incident thereon. The solar energy collection system can have a plurality of heliostats configured to concentrate solar radiation onto the external surface of the solar receiver. The solar energy collection system can also have an imaging device and a controller. The imaging device can be configured to provide a digital image of at least a portion of said external surface of the solar receiver. The controller can be configured to control the plurality of heliostats in response to the apparent brightness of the light-reflecting elements as represented in the digital image. Preferably, the light-reflecting elements produce substantially diffuse reflection of light energy incident thereon. The imaging device can include a camera.

Objects, advantages and novel features of the present disclosure will become apparent from the following detailed description when considered in conjunction with the accompanying drawings.

DETAILED DESCRIPTION

Figure 1A:
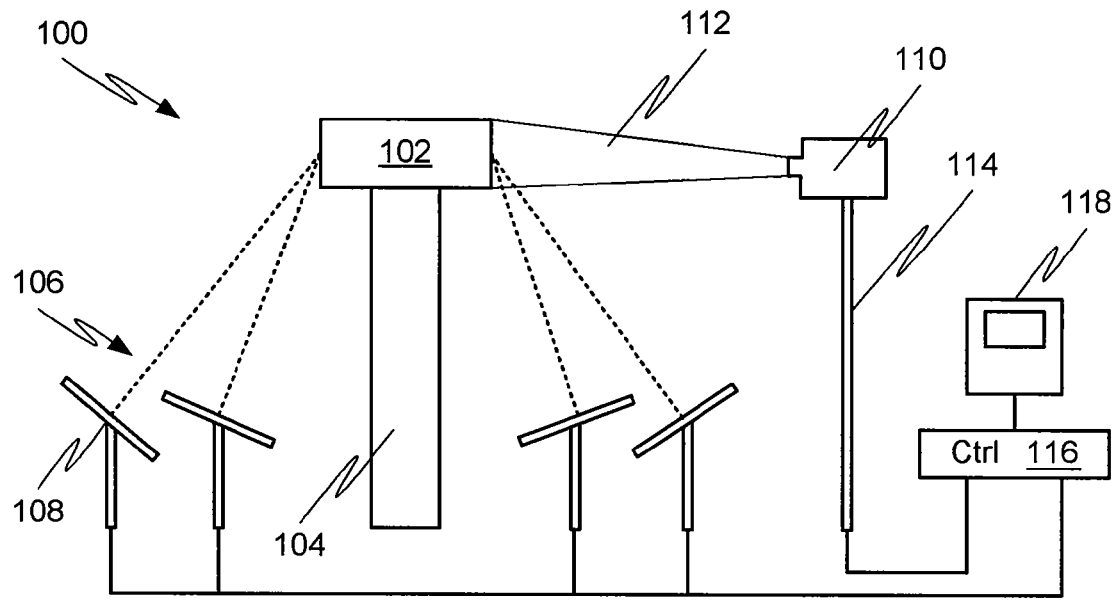
FIG. 1A is a diagrammatic elevation view of a solar power tower with a single receiver in a field of heliostats and a photogrammetric monitoring system.

In general, the present disclosure is directed to methods, systems, and devices for directly monitoring energy flux impinging on a surface of a solar receiver in a solar energy-based power generation system. When operating a solar power system that includes a solar receiver, it is desirable to know, for example, by means of measurement or calculation, the quantity of energy actually impinging on the external surface of the receiver, usually expressed as energy per unit of area, or flux. It is more desirable that the flux be known not just for the receiver surface as a whole but also for multiple locations on the receiver surface or for multiple subdivisions of the receiver's surface area. This can be achieved, for example, by measuring the flux at multiple points on the surface of the receiver, along multiple lines on the surface of the receiver, or at multiple subdivisions of an area on the surface of the receiver. It is especially desirable that the flux be known in real-time or as close to real-time as is practical given the limits of image capture and processing technologies.

The external surface of a solar receiver is commonly coated with a material selected for enhancing absorptivity of light energy. For example, a suitable light-absorbing layer or coating for the solar receiver surface can be a black paint such as Pyromark® High-Temperature Paint (manufactured by Tempil, Inc., of South Plainfield, N.J.), which has a manufacturer-specified solar absorptivity of 0.95 (i.e., 95%). Another suitable light-absorbing layer or coating for the solar receiver surface can include, for example, a quartz-encapsulated bimetallic alloy such as Crystal Clear Solar-Selective Coating (developed by Thermafin™ Holding, LLC, of Jacksonville, Fla.), which has a manufacturer-specified solar absorptivity of 0.975 (i.e., 97.5%).

Because the reflectivity may vary on the surface of the solar receiver from point to point and over time, light-intensity photogrammetry applied to coated solar receivers may be performed on 'targets' spaced from the coated solar receiver, for example, placed on a solar power tower below the solar receiver. Such targets may be used in conjunction with light-intensity photogrammetric techniques to evaluate the aiming error and to calibrate individual heliostats or groups of heliostats, which must be diverted from focusing on the solar receiver to focusing on the target for the purpose of the photogrammetric measurements. The solar energy reflected by those diverted heliostats is, in effect, wasted, since the diverted energy is not absorbed by the solar receiver and by the fluid therein. Accordingly, it is more desirable to leave the heliostats focused on the receiver and to perform light intensity measurements while the heliostats are focused on the receiver. It is also desirable to perform such measurements substantially in real-time.

Another method for mapping energy on the surface of a solar receiver is thermal photogrammetry. This technique can determine the temperature at the receiver surface. However, since the temperature is a product of light intensity, receiver design and materials, fluid flow rates, and other factors, thermal photogrammetry may not provide a direct indication of impinging energy flux on the solar receiver.

In an embodiment, a solar receiver includes light-reflecting elements on or near its surface which produce substantially diffuse (i.e., non-specular) reflection of light energy reflected thereonto by heliostats. Generally speaking, diffuse reflection is an effect of the scattering of light by or within the light-reflecting element. The terms 'diffuse reflection' and 'scattering' (or 'diffuse scattering') may be used interchangeably herein when describing the instant invention, and may be taken to include the effects of either or both of Rayleigh scattering and Mie scattering. In an alternative embodiment, reflection from the light-reflecting elements is at least partly diffuse.

Preferably, the at least one light-reflecting element produces substantially diffuse reflection of light energy reflected thereon by the at least one heliostat. Each of the light reflecting elements has a known constant reflectivity such that the flux impinging thereon can be determined by the luminance detected from the light reflected by it. Thus, a luminance value (alpha channel) from an image may be converted, based on a calibration curve, to a flux value for the respective part of the receiver.

The light-reflecting elements can aggregately cover less than one percent of the total surface area of the receiver. Since receiver surface area covered by light-reflecting elements will tend not to absorb substantial quantities of solar energy impinging thereupon, it can be said that on average the percentage of reflected solar energy not absorbed by the receiver is approximately equal to the percentage of receiver surface area covered by light-reflecting elements. Therefore, it is desirable to minimize the amount of surface area so covered by the light-reflecting elements.

According to a preferred embodiment, the light-reflecting elements aggregately cover less than one-tenth of one percent, or one thousandth, of the total surface area of the receiver. Preferably, the light-reflecting elements aggregately cover less than one percent of one percent, or one ten-thousandth, of the total surface area of the receiver.

The portions of the receiver surface not covered by light-reflecting elements can be covered by a light-absorbing layer or coating, such as those described above, which absorbs at least 95% of reflected solar radiation impinging thereupon. In a preferred embodiment, the light-absorbing layer is at least 97% absorptive. In another embodiment, the light-absorbing layer includes a selective coating with absorptivity of at least 95%, and preferably at least 97%, in the visible portion of the spectrum, while reducing emissivity in the infrared (IR) portion of the spectrum to less than 90%, and preferably to less than 70%. In an alternative embodiment, the emissivity of IR radiation is reduced to less than 90% above 400° C. and to less than 50% at temperatures above 600° C.

In another embodiment, the ratio of flux in the visible portion of the spectrum reflected by the light-reflecting elements to that reflected by the light-absorbing layer is at least 10 to 1, where the flux ratio is calculated either as an average taken across the entire surface area of the receiver, or at a subdivision of the receiver's surface contiguous to or surrounding a light-reflecting element. In a preferred embodiment, the ratio is at least 20 to 1, and in an especially preferred embodiment at least 30 to 1.

Referring to FIG. 1A, an example of a solar energy-based power generation system 100 can include a solar receiver 102, which can be a target for solar radiation reflected thereonto by heliostats 106 for the purpose of heating a working fluid. The receiver 102 can be located at the top of a single solar power tower 104, or at some other location, for example, if an intermediate reflector is used to bounce light received at the top of a tower down to a receiver located at ground level. The receiver 102 may include members for containing a fluid, such as tubes, conduits or cavities, and may also include elements for conveying a fluid to and from these members, such as pipes, ducts, channels or headers. Preferably, the receiver 102 is configured with a plurality of light-reflecting elements (not shown) on or near its surface which produce substantially diffuse reflection of light energy reflected thereonto by heliostats.

Each heliostat 108 in the field 106 can track the sun so as to reflect light onto the receiver 102 in the tower 104. Heliostats can be arrayed in any suitable manner, but preferably their spacing and positioning are selected to provide optimal financial return over a life cycle according to predictive weather data and at least one optimization goal such as total solar energy utilization, energy storage, electricity production, or revenue generation from sales of electricity.

The system 100 can also include an imaging device 110, such as photogrammetric or photographic equipment, capable of producing a digital image of the receiver 102. The imaging device 110 can be located within the field of heliostats 106 or external to the field of heliostats 106. The imaging device 110 can be located atop a boom or extension 114 to situate the imaging device 110 with a field of view 112 at the same level as receiver 102. Alternatively, the extension 114 may position the imaging device 110 at a height above the heliostat field 106 but below the height of the receiver 102. In another alternative, the imaging device 110 may be located at ground level without extension 114.

The digital image generated by the imaging device 110 can include a still image, a video image, or a series of still images, including, for example, time-lapse photography images. The imaging device 110 can produce a digital image of the receiver either upon command, continuously, or periodically, according to equipment design and programming. A single imaging device is illustrated in FIG. 1A for illustration purposes only, as additional imaging devices may be arranged about the receiver 102, each with a field of view of a surface of receiver 102. Each imaging device may have an independent field of view of the receiver 102 (i.e., a field of view that does not overlap with another imaging device). Alternatively or additionally, the field of view of at least one imaging device overlaps with the field of view of at least another imaging device.

The system 100 can include at least one controller 116 with software configured to perform an analysis of the digital image(s) of the receiver 102. The analysis can include differentiating among the respective light intensities reflected by the light-reflecting elements and the light-absorbing layer on the receiver 102. Preferably, a digital filter can be applied to the image to identify luminance values that do not correspond to a light-reflecting element based on position in the image, apparent brightness, and/or other information and to remove the identified luminance values so that only luminance values of the light-reflecting elements is used to determine flux measurements. Controller 116 can also determine whether distribution of light flux on the receiver 102 is in adherence with preselected target levels and/or patterns of light flux, and optionally providing such information to an operator through an interface 118, which can include a printout, a screen readout, an audio speaker, indicator lights, or any other known electronic interface. The controller 116 can also identify areas or points on the surface of the receiver 102 that are not in adherence with preselected target levels and/or patterns of light flux.

Controller 116 can also be configured to control heliostat aiming in response to the measurements obtained by the imaging device 110. For example, controller 116 can determine through algorithmic programming or hierarchical instructions whether to change the aiming points of heliostats focused on (i.e., reflecting light upon) the imaged receiver 102 based on the results of the light-intensity analysis to correct a perceived non-uniformity or a deviation from a preferred pattern for the flux on the surface of the receiver 102. The controller 116 can include communications devices such as wired or wireless modems, or a network, for transmitting such instructions to heliostats 108 in field 106. Results of the light-intensity analysis that can lead to a change in aiming points can include, for example, measurements of light intensity that do not adhere to preselected values or limits.

Figure 1B:
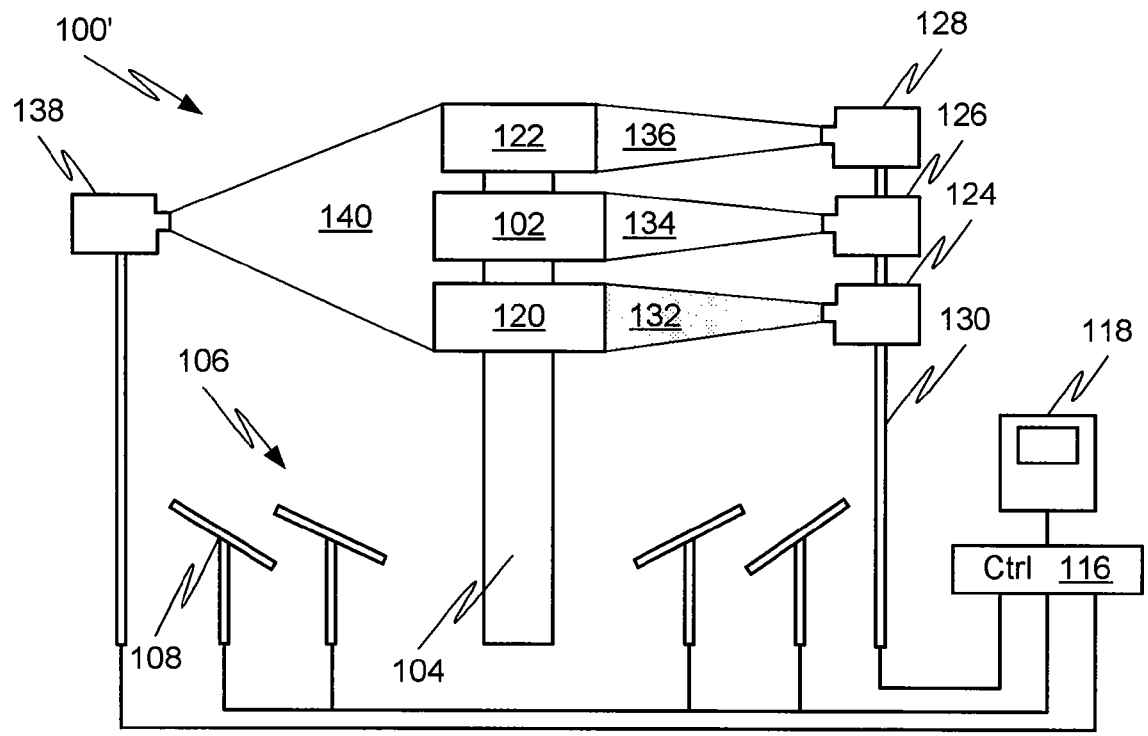
FIG. 1B is a diagrammatic elevation view of a solar power tower with multiple receivers in a field of heliostats and multiple photogrammetric monitoring systems.

In an alternative configuration shown in FIG. 1B, a single-tower system 100' can include three or more receivers, where a secondary receiver 122 heats a fluid to a first temperature and a primary receiver 102 heats a fluid, including the same fluid, to a second temperature which is higher than the first. The third receiver 120 can be used for reheating a fluid in a turbine reheat cycle to substantially the second temperature. Preferably, each of the receivers 102, 120, and 122 are configured with a plurality of light-reflecting elements (not shown) on or near their surface which produce substantially diffuse reflection of light energy reflected thereonto by heliostats.

Each receiver may have a separate imaging device assigned to a portion thereof. For example, imaging device 124 may be provided on extension 130 with a field of view 132 on a surface of receiver 120. Imaging device 126 may be provided on extension 130 with a separate field of view 134 on a surface of receiver 102. Similarly, imaging device 128 may be provided on extension 130 with a separate field of view 136 on a surface of receiver 122. Additionally or alternatively, a single imaging device 138 may have a field of view 140 sufficiently large to simultaneously image all three receivers 102, 120, and 122. The controller 116 may use the images generated by the imaging devices to directly monitor the incident flux on each receiver and adjust heliostat aiming in response thereto, as described above.

Figure 2:
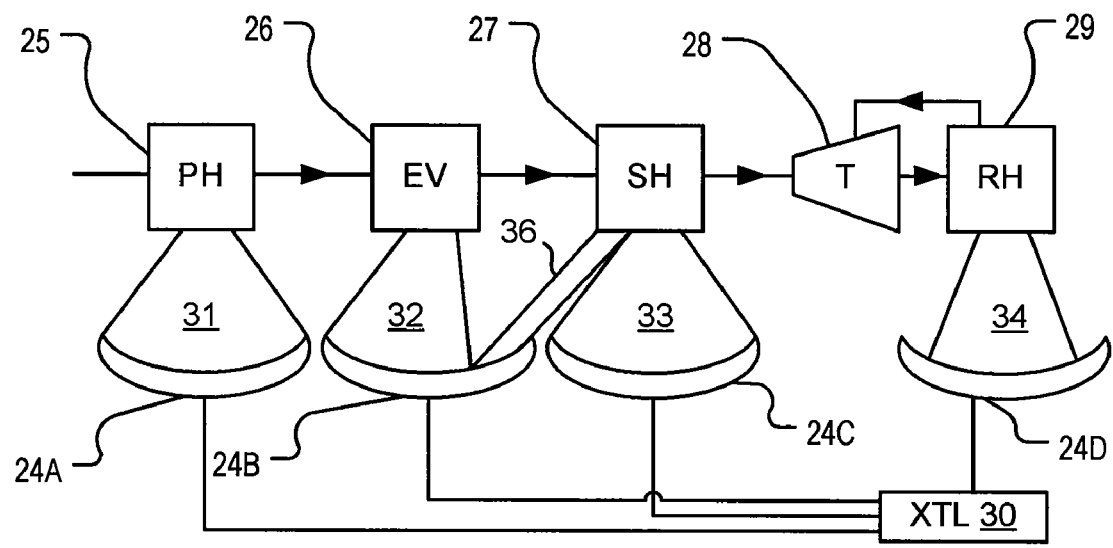
FIG. 2 is a simplified diagram showing a layout of various solar receivers with associated heliostats in a turbine-based solar power system.

Referring now to FIG. 2A, a solar energy based power system can include a preheating stage, an evaporation stage, a superheating stage, and a reheating stage. A receiver, a section of a receiver, or multiple receivers or sections are represented by the box indicated at 25. For simplicity this will be referred to as receiver 25. Receiver 25 is configured such that a selected quantity of light 31 from a heliostat array 24A is incident thereon. A controller 30 controls each of the heliostats (not shown individually in this figure) in the arrays 24A-24D. Note that heliostat array 24A-24D may all be part of the same field or separate fields. The array 24A includes a selected set of heliostats and does not necessarily represent a contiguous array. The array 24A is preferably a subset of a larger set of heliostats which includes those of arrays 24B, 24C, and 24D. The light 31 heats the receiver 25 which in turn preheats a working fluid, for example, water, either directly or via a combination of a circulating heat transfer fluid and a heat exchanger, which are not shown. The preheated working fluid is then evaporated in an evaporating stage by the heat collected by a receiver 26 (which also may be one or more receivers or receiver sections). The light 32 from heliostat array 24B is incident on the evaporator receiver 26 and provides the energy for evaporation. Similarly, light 33 from heliostat array 24C is incident on the superheating receiver 27 and provides the energy for superheating the evaporated working fluid, for example, steam. The superheated steam drives a turbine 28. A reheat section 29 can receive radiation 34 from its own associated heliostat array 24D as well.

Preferably, at least some of the receivers 25-27 and 29 are configured such that they can be selectively illuminated by selected heliostats from different heliostat arrays. That is, selected heliostats focused on one receiver can be diverted to a different receiver, such as the superheating receiver 27 or the reheating receiver 29, to achieve any of several objectives. For example, in directly monitoring the energy flux impinging on the surface of one of the solar receivers, for example, the superheating receiver, which operates at a higher temperature than the preheating or evaporating receiver, a variation in the uniformity of the flux may be observed. The diversion of heliostats from one receiver to another may be in response to this observation as a countermeasure by the controller 30 to compensate for the observed variation. This diversion of heliostats, for example, from one receiver 26 to another receiver 27, is illustrated in FIG. 2A by the flux indicated figuratively at 36. Note that the embodiment of FIG. 2A may be modified to include more or fewer stages and the stages may be different, such as for example with a Brayton cycle-based system using air. In the latter case, the stages may be temperature stages. The separation of the temperature stages allows the controller 30 to select heliostats to achieve and to maintain temperature or flux uniformity goal state as conditions change by selecting heliostats and aiming points appropriately.

According to various embodiments, when the ability of certain heliostats to supply reflected light to a particular receiver is compromised, such as by transient cloud coverage, damage, or becoming faulty, heliostats can be reallocated to achieve specified control goals, such as temperature uniformity of a high temperature receiver. This transient may be observed using the photogrammetric or photographic analysis of the light-reflecting elements on the surface of each receiver, as discussed in detail herein. Any of the arrays 24A through 24D may be configured to be divertible in such a manner to achieve various objectives.

In an embodiment, the light-reflecting elements can include a diffusely reflective paint. The reflecting paint can be painted on top of a light-absorbing layer. In an alternative embodiment, the reflecting paint can be provided on protrusions on the external surface of the receiver and/or in pockmarks (i.e., small pits or recesses) in the external surface of the receiver. These protrusions and/or pockmarks may or may not be covered by a light-absorbing layer prior to providing the reflecting paint thereon. Preferably, the diffusely reflecting paint includes high-temperature paint. For example, suitable high-temperature paint can include modified organic silicon resin paint, such as TR626 or TR627 (produced by Osaka Paint in Gushan town, Jiangyin, Jiangsu province, People's Republic of China).

In another preferred embodiment, the diffusely reflecting paint can include additives to enhance refraction thereby increasing the diffuse reflectivity of the paint. For example, a suitable additive can include a high-temperature titanium dioxide ceramic paint, such as that disclosed in U.S. Pat. No. 5,759,251, entitled "Titanium Dioxide Ceramic Paint and Method of Producing Same," issued Jun. 2, 1998, which is hereby incorporated by reference herein in its entirety.

In yet another preferred embodiment, the diffusely reflecting paint can include beads added thereto or suspended therein for enhanced refraction. As noted above, enhancing the refraction of the paint increases the diffuse reflectivity of the paint. The beads can be made from a glasslike temperature-resistant material. For example, glasslike temperature-resistant materials for the beads can include, but are not limited to, high-silica glass, sapphire, and silica with highly refractive ceramic alumina and/or zirconia.

The beads can be less than 50 μm in diameter. Preferably, the beads are less than 5 μm in diameter. Beads of less than approximately 5 μm diameter, which is approximately ten times the wavelength of visible light, can provide a Mie scattering effect with respect to light energy impinging on the light-reflecting elements and thereby cause reflection of the light energy therefrom to be mostly diffuse, i.e., non-specular. For example, suitable beads for use in the diffusely reflecting paint are plus9spots® or plus9beads® (produced by Swarco Vestglas Vestische Strahl- and Reflexglas GmbH of Recklinghausen, Austria).

In another embodiment, the light-reflecting elements may be portions of the receiver surface that are uncoated by the light-absorbing coating. For example, the uncoated surface of the solar receiver may be formed from a material and with a surface roughness sufficient to serve as a diffuse reflector for visible light. Portions of the solar receiver surface may thus be uncoated, such as by masking the portions during the light-absorbing coating process or ablating the light-absorbing coating from the surface after the coating process, such that the portions may serve as light-reflecting elements.

In another embodiment, the light-reflecting elements are distributed in a geometric pattern on the external surface of the receiver. The geometric pattern can be, for example, a rectangular array or a radial array, or an intersecting set of lines or curves, where the light-reflecting elements are arranged at constant pitch, i.e., with equal spacing between them, along at least one axis of the array.

Figure 3:
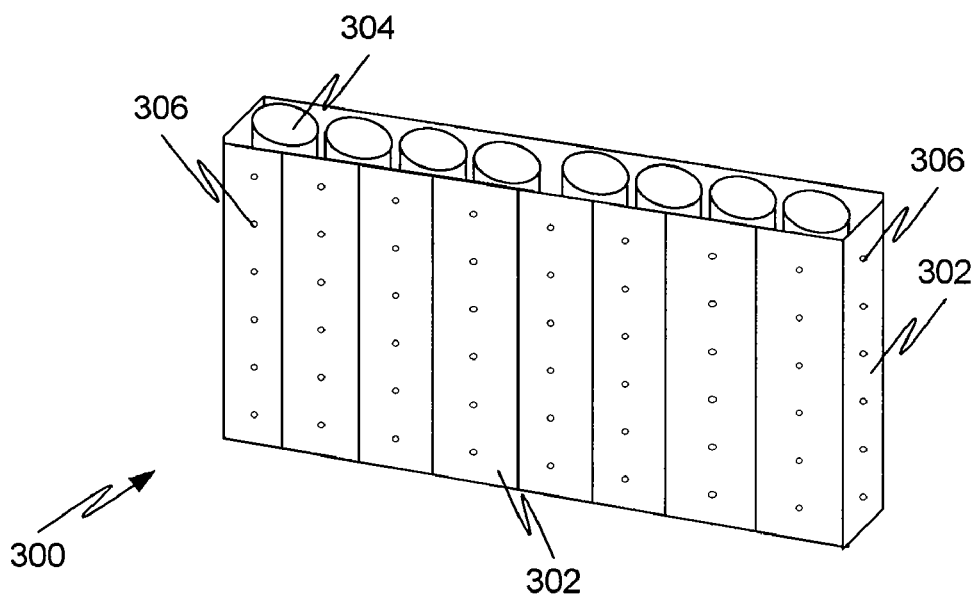
FIG. 3 is an oblique projection of a flat panel solar receiver with light reflecting elements.

FIG. 3 illustrates a flat-panel receiver 300 with exterior surfaces which has a light-absorbing layer 302 thereon. Disposed within the receiver is a plurality of fluid-containing members 304, which may be used to transmit the working fluid for a solar energy-based power generation system. A plurality of light-reflecting elements 306 can be distributed in a substantially rectangular array on the exterior surfaces which include a light-absorbing layer 302. Although the light-reflecting elements 306 are illustrated in the figure as having a circular geometry, other geometries are of course possible. For example, the light-reflecting elements can have, but are not limited to, circular, oval, elliptical, polygonal, or non-regular geometries.

In another example, the geometric pattern for the light-reflecting elements can be an array with a higher density of light-reflecting elements on one area of the receiver's surface than another. For example, such a 'skewed' array may have a lower density of light-reflecting elements closer to the edges of the receiver than in the center, or may have a higher density of light-reflecting elements in more temperature-sensitive areas of the receiver, such as a superheating section, than in the less temperature-sensitive areas, such as a steam generation panel.

Figure 4:
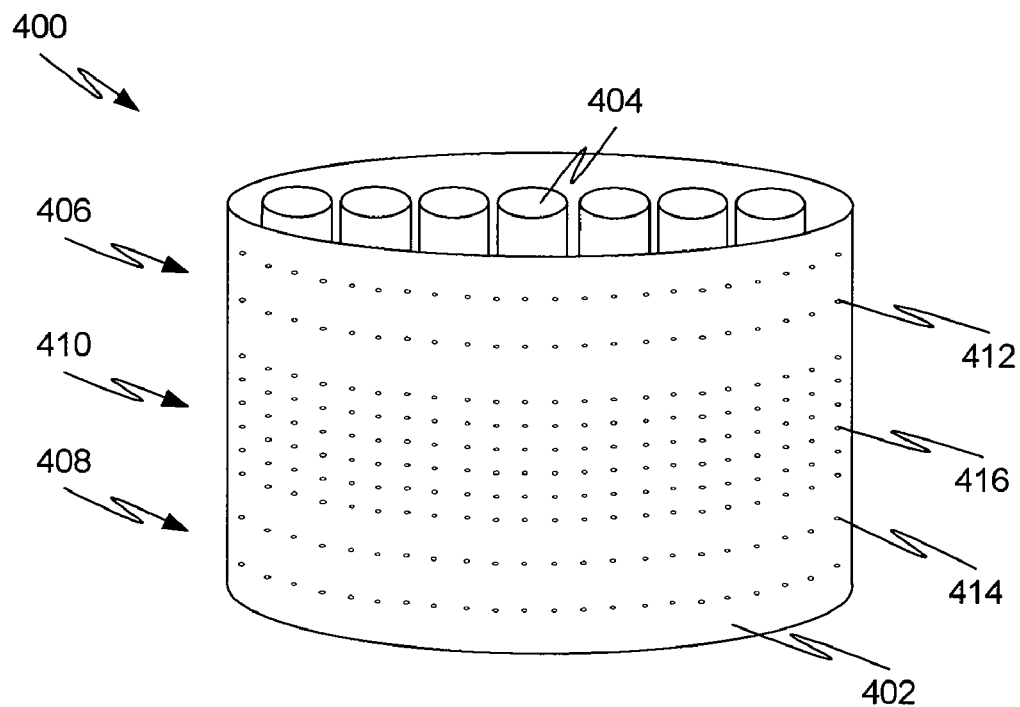
FIG. 4 is an oblique projection of a cylindrical solar receiver with light reflecting elements.

An example of a skewed array of light-reflecting elements is illustrated in FIG. 4. A cylindrical receiver 400 can have an exterior surface which includes a light-absorbing layer 402. Disposed within the receiver 400 is a plurality of fluid-containing members 404, which may be used to transmit the working fluid for a solar energy-based power generation system. In a region 406 close to the top edge of the cylindrical receiver, the monitoring of the flux may be less critical. Similarly, in a region 408 close to the bottom of the cylindrical receiver, the monitoring of the light flux may be less critical than a region 410 in the central portion of the cylindrical receiver. Thus, an array of light reflecting elements 412 in region 406 and an array of light reflecting elements 414 in region 408 can have a larger spacing as compared to an array of light reflecting elements 416 in region 410. Thus, the plurality of light-reflecting elements is, in effect, distributed in an irregularly spaced array on the exterior surface of the cylindrical receiver 400.

The size (e.g., diameter) of each light-reflecting element and the pitch (i.e., spacing) between each light-reflecting element can be jointly determined by taking into account a number of factors including, but not exclusively, the dimensions of the receiver, the light absorptivity of the light-absorbing layer applied to the surface of the receiver, the technical specifications (e.g., resolution and pixel size) of the photogrammetric equipment that will be used to measure light intensity reflected by the receiver including by each of the light-reflecting elements, the technical specifications of the material used in the light-reflecting elements, the process employed in applying or installing the light-reflecting elements on the surface of the receiver, and the maximum coverage area allowed for light-reflecting elements by the designer or operator of the receiver, usually because of lost energy absorption opportunity as described earlier.

For example, the external dimensions of the surface of a flat-panel receiver can 12 m by 12 m. The maximum allowable coverage area can be 0.1%. The material and installation process for the light-reflecting elements can require the diameter or lateral dimension of each of the light-reflecting elements to be at least 3 mm. The photogrammetric equipment specified may be configured to measure the intensity of light reflected by light-reflecting elements having a diameter of 3 mm arranged on a 12 m×12 m receiver only if they are spaced at least 12 cm apart. Coverage approximately equal to the 0.1% maximum allowable coverage could be achieved if 3 mm light-reflecting elements were to be spaced 9.5 cm apart, but the constraints of the photogrammetric equipment would require a spacing of at least 12 cm.

In another example, a cylindrical receiver is 11 m high and has a diameter of 8 m. The maximum allowable coverage area can be 0.01%. The material and installation process for the light-reflecting elements can require the diameter of each of the light-reflecting elements to be at least 2 mm. The photogrammetric equipment specified may be configured to measure the intensity of light reflected by light-reflecting elements having a diameter of 2 mm on an 11 m high by 8 m diameter receiver only if they are spaced at least 18 cm apart. Coverage approximately equal to the 0.01% maximum allowable coverage could be achieved if 2 mm light-reflecting elements were to be spaced 20 cm apart, which the constraints of the photogrammetric equipment (at least 18 cm) would allow.

In an alternative embodiment, the light-reflecting elements are distributed randomly across the external surface of the receiver. The random distribution can be effected through the use of a conventional computerized randomizing routine, or alternatively by a computer algorithm based on data sampled from a random natural phenomenon, such as atmospheric noise. Preferably the random distribution will be limited by minimum and maximum spacing values. In an example, the light-reflecting elements are distributed randomly using x- and y-values on the external surface of the receiver, where the values were generated with a conventional randomizing algorithm with the constraint that each light-reflecting element is at least 10 cm in any direction from the nearest one, and no more than 20 cm.

In another embodiment, the light-reflecting elements include a diffusely reflective solid. The solid elements can be embedded in the light-absorbing layer or in the external surface of the receiver itself, or mechanically attached to the receiver before or after the application of the light-absorbing layer. Preferably the solid includes a high-temperature resistant material, for example, a ceramic material or sapphire. In an alternative embodiment the solid light-reflecting element is molded and can include metallic, ceramic or composite materials. The solid elements may be arranged in any of the patterns for the light-reflecting elements described herein.

In another alternative embodiment a molded solid light-reflecting material includes additives for enhancing refraction and increasing diffuse reflectivity, where the additives can include any of those previously described with respect to other embodiments and/or examples. In an alternative embodiment, the light-reflecting elements are suspended in or otherwise mixed in with the materials used in creating the light-absorbing layer and are applied to the receiver surface together with the light-absorbing layer material.

In another embodiment, the light-reflecting elements can include a thread. The term 'thread' as used herein includes any thread-like element, including string, fiber, cord, or spun, braided, twisted or otherwise fabricated multi-thread yarns. In an alternative embodiment, the light-reflecting elements include a tape or similar ribbon-like element. The thread or tape chosen can be appropriate for the high temperatures on the external surface of a solar receiver, for example, a silica yarn, such as AVSIL Y-40 (available from AVS Industries, LLC, of New Castle, Del.), or a silica tape, such as AMI-SIL AS20-1.5 (available from Auburn Manufacturing Inc. of Mechanic Falls, Me.). The dimensions of the thread and/or tape can be chosen such that the thread or tape is no wider than 500 µm. Preferably, the thread or tape is narrower than 500 µm so as to minimize the amount of the receiver surface covered.

In a preferred embodiment, the threads or tapes are interconnected, interwoven, or knotted, or, alternatively, overlain in an intersecting manner without thread-to-thread connection, so as to form a net or network on the external surface of the receiver. In another preferred embodiment, the threads or tapes are interconnected at or near their respective ends, or, alternatively, are attached to the receiver at or near their respective ends, in order to form a shroud of roughly parallel threads or tapes that can be provided on the external surface of the receiver in a substantially horizontal, vertical or diagonal direction.

Figure 5:
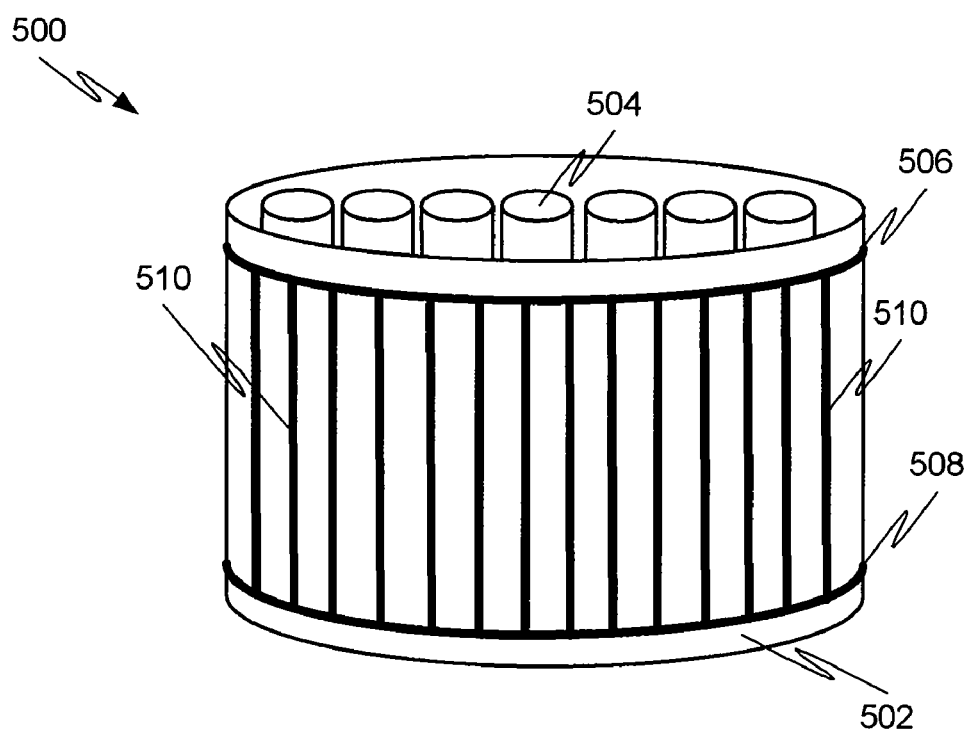
FIG. 5 is an oblique projection of a cylindrical solar receiver with a light reflecting shroud.

Referring now to FIG. 5, a cylindrical receiver 500 has an exterior surface with a light-absorbing layer 502 thereon. Disposed within the receiver is a plurality of fluid-containing members 504, which may be used to transmit the working fluid for a solar energy-based power generation system. A plurality of light-reflecting threads 510 can be provided in the form of a shroud of roughly parallel lines on the exterior surface of the receiver. The light-reflecting threads 510 may be connected near their top ends to a connecting element 506 and near their bottom ends to a connecting element 508. Connecting elements 506 and 508 can also be light-reflecting threads. Connecting elements 506 and 508 may be tightened around the diameter of the receiver 500 and optionally attached thereto so as to keep the shroud in place on the receiver surface.

According to a further preferred embodiment, reflection of light from the threads or tapes is substantially diffuse or at least partly diffuse. One way to accomplish this is to choose a thread or tape with a matte finish, which increases scattering of light at the thread's or tape's surface. Alternatively, the thread or tape may be coated with a diffusely reflecting material, for example the high-temperature titanium dioxide ceramic paint disclosed in U.S. Pat. No. 5,759,251. According to an alternative preferred embodiment, the diffuse reflectivity of the thread or tape can be enhanced by the addition of light-reflecting elements, such as those described above in other embodiments and examples, where the additional light-reflecting elements are affixed to the thread or tape, including at the intersection points of pairs of threads or tapes.

In another embodiment, a system for controlling heliostats in a solar power tower system includes a receiver that includes light-reflecting elements according to any of the embodiments and examples described herein. The system for controlling heliostats may also include photogrammetric or photographic equipment capable of producing a digital image of the receiver. The digital image can include a still image, a video image, or a series of still images, including, for example, time-lapse photography images. The photogrammetric or photographic equipment produces a digital image either upon command, continuously, or periodically, according to equipment design and programming.

In a preferred embodiment, the system additionally includes at least one computer processor and software capable of performing an analysis of the digital image of the receiver, where the analysis includes differentiating among the respective light intensities reflected by light-reflecting elements and a light-absorbing layer on the receiver. Preferably, a digital filter can be applied to the image of the receiver to identify luminance values that do not correspond to a light-reflecting element based on position in the image, apparent brightness, and/or other information and to remove the identified luminance values so that only luminance values of the light-reflecting elements can be used to determine flux measurements.

In an especially preferred embodiment, the system can additionally include software capable of determining whether distribution of light flux on the receiver is in adherence with preselected target levels and/or patterns of light flux. Optionally, the system can provide such information to an operator through an interface which can include a printout, a screen readout, an audio speaker, indicator lights, or any other electronic interface as is known in the art. In an alternative especially preferred embodiment, the software is capable of identifying areas or points on the surface of the receiver that are not in adherence with preselected target levels and/or patterns of light flux, and of optionally providing such information to an operator.

In another especially preferred embodiment, the system can additionally include data recording equipment capable of writing data on magnetic, optical or solid-state data storage media, and additionally includes software instructions to record thereupon either the digital images of the receiver or the ensuing light-intensity analyses thereof, or both.

In yet another especially preferred embodiment, the system includes software that determines through algorithmic programming or hierarchical instructions whether to change the aiming points of heliostats focused on (i.e., reflecting light upon) the imaged receiver based on the results of the light-intensity analysis, and optionally includes communications devices such as wired or wireless modems, or a network, for transmitting such instructions to heliostats. Results of the light-intensity analysis that can lead to a change in aiming points can include, for example, measurements of light intensity that do not adhere to preselected values or limits.

In another embodiment, a method for operating a solar power tower system includes using photogrammetric or photographic equipment to produce digital images of a receiver that includes light-reflecting elements according to any of the embodiments described above. The method may include producing a digital image either upon command, continuously, or periodically, according to equipment design and programming.

In a preferred embodiment, the method additionally includes performing an analysis of the digital image of the receiver, where the analysis includes using software to differentiate among the respective light intensities reflected by light-reflecting elements and a light-absorbing layer on the receiver.

In an especially preferred embodiment, the method additionally includes using software to determine whether distribution of light flux on the receiver is in adherence with preselected target levels and/or patterns of light flux, and optionally includes providing such information to an operator through an interface which can include a printout, a screen readout, an audio speaker, indicator lights, or any other electronic interface as is known in the art. In an alternative especially preferred embodiment, the method includes identifying areas or points on the surface of the receiver that are not in adherence with preselected target levels and/or patterns of light flux, and optionally includes providing such information to an operator.

In another especially preferred embodiment, the method additionally includes recording either the digital images of the receiver or the ensuing light-intensity analyses thereof, or both, on magnetic, optical or solid-state data storage media.

In yet another especially preferred embodiment, the method includes determining whether to change the aiming points of heliostats focused on the imaged receiver based on the results of the light-intensity analysis, and optionally includes transmitting instructions to heliostats to change (or, optionally, to alternatively retain) aiming points, where the transmission is effected through provided communications devices such as wired or wireless modems, or a network. Results of the light-intensity analysis that can lead to a change in aiming points include, for example, measurements of light intensity that do not adhere to preselected values or limits.

In another embodiment, a method for measuring energy flux on the surface of a receiver in a solar power tower system includes using photogrammetric or photographic equipment to produce digital images of a receiver that includes light-reflecting elements according to any of the embodiments or examples described herein.

It should be appreciated that steps of the present disclosure may be repeated in whole or in part in order to directly monitor the flux impinging on a surface of a receiver and adjust heliostat aiming in response thereto. Further, it should be appreciated that the steps mentioned above may be performed on a single or distributed processor. Also, the processes, modules, and units described in the various embodiments above may be distributed across multiple computers/systems or may be co-located in a single processor/system.

Embodiments of the method, system, and computer program product for directly monitoring the energy flux impinging on a surface of a solar receiver and/or adjusting heliostat aiming in response thereto may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any process capable of implementing the functions or steps described herein can be used to implement embodiments of the method, system, or computer program product for directly monitoring the flux impinging on a surface of a receiver.

Furthermore, embodiments of the disclosed method, system, and computer program product for directly monitoring the energy flux impinging on a surface of a solar receiver and/or adjusting heliostat aiming in response thereto may be readily implemented, fully or partially, in software using, for example, object or object-oriented software development environments that provide portable source code that can be used on a variety of computer platforms. Alternatively, embodiments of the disclosed method, system, and computer program product for directly monitoring the energy flux impinging on a surface of a solar receiver and/or adjusting heliostat aiming in response thereto can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized.

Embodiments of the method, system, and computer program product for directly monitoring the energy flux impinging on a surface of a solar receiver and/or adjusting heliostat aiming in response thereto can be implemented in hardware and/or software using any known or later developed systems or structures, devices and/or software by those of ordinary skill in the applicable art from the function description provided herein and with a general basic knowledge of the computer, solar energy-based power systems, and photogrammetric arts.

Moreover, embodiments of the disclosed method, system, and computer program product for directly monitoring the energy flux impinging on a surface of a solar receiver and/or adjusting heliostat aiming in response thereto can be implemented in software executed on a programmed general purpose computer, a special purpose computer, a microprocessor, or the like. Also, the method for directly monitoring the energy flux impinging on a surface of a solar receiver and/or adjusting heliostat aiming in response thereto can be implemented as a program embedded on a personal computer such as a JAVA® or CGI script, as a resource residing on a server or image processing workstation, as a routine embedded in a dedicated processing system, or the like. The method and system can also be implemented by physically incorporating the method for directly monitoring the flux impinging on a surface of a solar receiver and/or adjusting heliostat aiming in response thereto into software and/or hardware systems, such as the hardware and software systems of solar power system.

It is, therefore, apparent that there is provided, in accordance with the present disclosure systems, methods, and devices for directly monitoring the energy flux impinging on a surface of a solar receiver. Many alternatives, modifications, and variations are enabled by the present disclosure. Features of the disclosed embodiments and examples can be combined, rearranged, omitted, etc., within the scope of the present disclosure to produce additional embodiments. Furthermore, certain features of the disclosed embodiments and examples may sometimes be used to advantage without a corresponding use of other features. Persons skilled in the art will also appreciate that the present invention can be practiced by other than the described embodiments and examples, which are presented for purposes of illustration and not to limit the invention as claimed. Accordingly, Applicants intend to embrace all such alternatives, modifications, equivalents, and variations that are within the spirit and scope of the present disclosure.

What is claimed is:

1. A solar energy collection system comprising:
   at least one receiver configured to receive on an external surface thereof reflected solar radiation from heliostats, the at least one receiver housing at least one fluid conveying member for conveying a working fluid therethrough, the external surface having a light-absorbing coating thereon; and
   light-reflecting elements disposed on the external surface, the light-reflecting elements producing at least partially diffuse reflection of light energy reflected thereon by the heliostats;
   an imaging device for determining the apparent brightness of each of the light-reflecting elements and providing a brightness signal; and
   a controller configured to compute a flux distribution across the surface of the at least one receiver responsively to the apparent brightness signal.

2. The solar energy collection system according to claim 1, wherein the light-reflecting elements produce substantially diffuse reflection of light energy reflected thereon by the heliostats.

3. The solar energy collection system according to claim 1, wherein the brightness signal defines an image.

4. The solar energy collection system according to claim 1, wherein the imaging device includes a camera.

5. The solar energy collection system according to claim 1, wherein each of the light-reflecting elements has a uniform, constant and predetermined reflectivity over its surface.

6. The solar energy collection system according to claim 1, wherein the light-reflecting elements are arranged at different locations on the external surface of the at least one receiver.

7. The solar energy collection system according to claim 6, wherein the surface area of the external surface covered by the light-reflecting elements is less than 1% of the total surface area of the external surface.

8. The solar energy collection system according to claim 1, wherein the light-absorbing coating has an absorptivity in the visible light band that is greater than 95% and an emissivity in the infrared band of less than 90%.

9. The solar energy collection system according to claim 1, wherein a ratio of visible light flux reflected by the light-reflecting elements to that reflected by the light-absorbing coating is at least 10 to 1.

10. The solar energy collection system according to claim 1, wherein the light-reflecting elements are painted with a uniform reflective coating.

11. The solar energy collection system according to claim 10, wherein the reflective coating is high-temperature paint with additives for enhanced refraction.

12. The solar energy collection system according to claim 11, wherein the additives include beads.

13. The solar energy collection system according to claim 12, wherein the beads have a diameter less than 50 μm.

14. The solar energy collection system according to claim 1, wherein the light-reflecting elements include a diffusively reflective solid.

15. The solar energy collection system according to claim 14, wherein the diffusively reflective solid is mixed in with the light-absorbing coating.

16. The solar energy collection system according to claim 1, wherein the light-reflecting elements include a thread or a tape.

17. The solar energy collection system according to claim 1, wherein the light-reflecting elements include a plurality of threads arranged so as to form a shroud.

18. A solar energy collection system comprising:
   a solar receiver having an external surface configured for high absorption of light, the solar receiver also having a plurality of light-reflecting elements arranged on the external surface, the light-reflecting elements producing at least partially diffuse reflection of light energy incident thereon;
   a plurality of heliostats configured to concentrate solar radiation onto the external surface of the solar receiver;
   an imaging device configured to provide a digital image of at least a portion of said external surface of the solar receiver; and
   a controller configured to control the plurality of heliostats in response to the apparent brightness of the light-reflecting elements as represented in the digital image.

19. The solar energy collection system of claim 18, wherein the light-reflecting elements produce substantially diffuse reflection of light energy incident thereon.

20. The solar energy collection system of claim 18, wherein the imaging device includes a camera.

* * * * *